(12) United States Patent
Palmer et al.

(10) Patent No.: US 12,543,855 B2
(45) Date of Patent: Feb. 10, 2026

(54) REINFORCED STRUCTURE AND METHOD FOR REINFORCING SAME

(71) Applicant: KETER HOME AND GARDEN PRODUCTS LTD., Herzliya (IL)

(72) Inventors: James Palmer, Indianapolis, IN (US); Richard Evans, Longmeadow, MA (US); Dikla Mualem, Shoham (IL)

(73) Assignee: KETER HOME AND GARDEN PRODUCTS LTD, Herzliya (IL)

( * ) Notice: Subject to any disclaimer, the term of this patent is extended or adjusted under 35 U.S.C. 154(b) by 22 days.

(21) Appl. No.: 18/698,159

(22) PCT Filed: Sep. 28, 2022

(86) PCT No.: PCT/IL2022/051026
§ 371 (c)(1),
(2) Date: Apr. 3, 2024

(87) PCT Pub. No.: WO2023/058014
PCT Pub. Date: Apr. 13, 2023

(65) Prior Publication Data
US 2025/0234998 A1    Jul. 24, 2025

(30) Foreign Application Priority Data
Oct. 6, 2021  (IL) .......................... 287055

(51) Int. Cl.
*A47B 96/02* (2006.01)
*B29C 65/08* (2006.01)
*B29L 31/44* (2006.01)

(52) U.S. Cl.
CPC ............ *A47B 96/021* (2013.01); *B29C 65/08* (2013.01); *B29L 2031/44* (2013.01)

(58) Field of Classification Search
CPC ..... A47B 96/021; A47B 96/20; A47B 13/083; A47B 96/201; A47B 2200/0004;
(Continued)

(56) References Cited

U.S. PATENT DOCUMENTS 3,998,069 A * 12/1976 Kronenberger ....... F25D 17/045
211/183
4,731,918 A * 3/1988 Burghardt ................. B27F 5/12
29/525.12
(Continued)

FOREIGN PATENT DOCUMENTS

DE    29621679 U1    2/1997
JP    S4858327 U     7/1973
(Continued)

*Primary Examiner* — Jennifer E. Novosad
(74) *Attorney, Agent, or Firm* — Vorys, Sater, Seymour and Pease, LLP; Maryellen Feehery Hank

(57) ABSTRACT

Polymeric furniture structure elements include a furniture element configured with a first face and a spaced apart second face and one or more reinforcing members extending between the first face and the second face, a plurality of throughgoing stud receiving bores extending through the one or more reinforcing members between the first face and the second face; the first face being configured with a reinforcing element bearing surface, and the second face is configured with a stud bearing surface; and a reinforcing element that is configured with a first face bearing surface, and a plurality of studs extending from first face bearing surface that are disposed in register with locations of at least some of the stud receiving bores, and a free end of the studs is configurable with a bearing head for tight bearing over the stud bearing surface.

16 Claims, 10 Drawing Sheets

(58) Field of Classification Search
CPC ... A47B 57/588; A47B 96/043; A47B 96/206; A47B 2096/207; A47B 2096/208; A47B 2086/209
USPC ....... 211/134, 85.13, 41.6; 220/572; 108/90, 108/27
See application file for complete search history.

(56) References Cited

U.S. PATENT DOCUMENTS

| | | | | |
|---|---|---|---|---|
| 5,069,554 | A * | 12/1991 | Bonnett | A47G 11/003 53/413 |
| 5,085,154 | A * | 2/1992 | Merl | A47F 5/0043 211/184 |
| 5,538,147 | A * | 7/1996 | Fucci | A47F 5/01 108/90 |
| 5,709,158 | A * | 1/1998 | Wareheim | A47B 87/0246 211/188 |
| 6,116,436 | A * | 9/2000 | Ferrucci | G11B 33/0444 |
| 6,244,447 | B1 * | 6/2001 | Frieze | A61L 2/26 206/370 |
| 6,401,945 | B1 * | 6/2002 | Gawel | A47F 5/0043 211/183 |
| 6,725,785 | B2 * | 4/2004 | Wang | A47B 13/08 108/90 |
| 7,128,000 | B2 * | 10/2006 | Mummert | A47F 7/0071 108/92 |
| 10,299,590 | B2 * | 5/2019 | Olson | A47B 96/021 |
| 2004/0004052 | A1 * | 1/2004 | Young | A47F 5/01 211/183 |
| 2004/0050812 | A1 * | 3/2004 | Rojas | A47F 5/0068 40/649 |
| 2006/0180056 | A1 * | 8/2006 | Dorholt | A47B 13/086 108/90 |
| 2012/0000867 | A1 * | 1/2012 | Saving | A47B 45/00 235/494 |
| 2012/0031864 | A1 * | 2/2012 | Wasson | A47B 96/021 211/134 |
| 2012/0169196 | A1 * | 7/2012 | Marchetti | E06B 5/006 312/265.6 |
| 2013/0078035 | A1 * | 3/2013 | Mueller | A47F 5/005 403/345 |
| 2016/0235201 | A1 * | 8/2016 | Sööt | A47B 96/20 |
| 2016/0242573 | A1 * | 8/2016 | Colelman | A47B 57/588 |
| 2020/0205569 | A1 * | 7/2020 | Jones | D06F 39/12 |
| 2020/0397142 | A1 * | 12/2020 | Sampson | A47B 96/20 |
| 2021/0227999 | A1 * | 7/2021 | Smedley | A47F 5/005 |
| 2025/0185796 | A1 * | 6/2025 | Evans | A45F 5/1575 |
| 2025/0234998 | A1 * | 7/2025 | Palmer | A47B 96/205 |
| 2025/0275074 | A1 * | 8/2025 | Quinn | H05K 5/03 |

FOREIGN PATENT DOCUMENTS

| | | | |
|---|---|---|---|
| JP | S4858327 A * | 8/1973 | .............. H02P 5/753 |
| JP | 2778560 B2 | 7/1998 | |
| JP | 3051780 U | 9/1998 | |
| WO | 2016056912 A1 | 4/2016 | |
| WO | WO-2023058014 A1 * | 4/2023 | ........... A47B 96/021 |

* cited by examiner

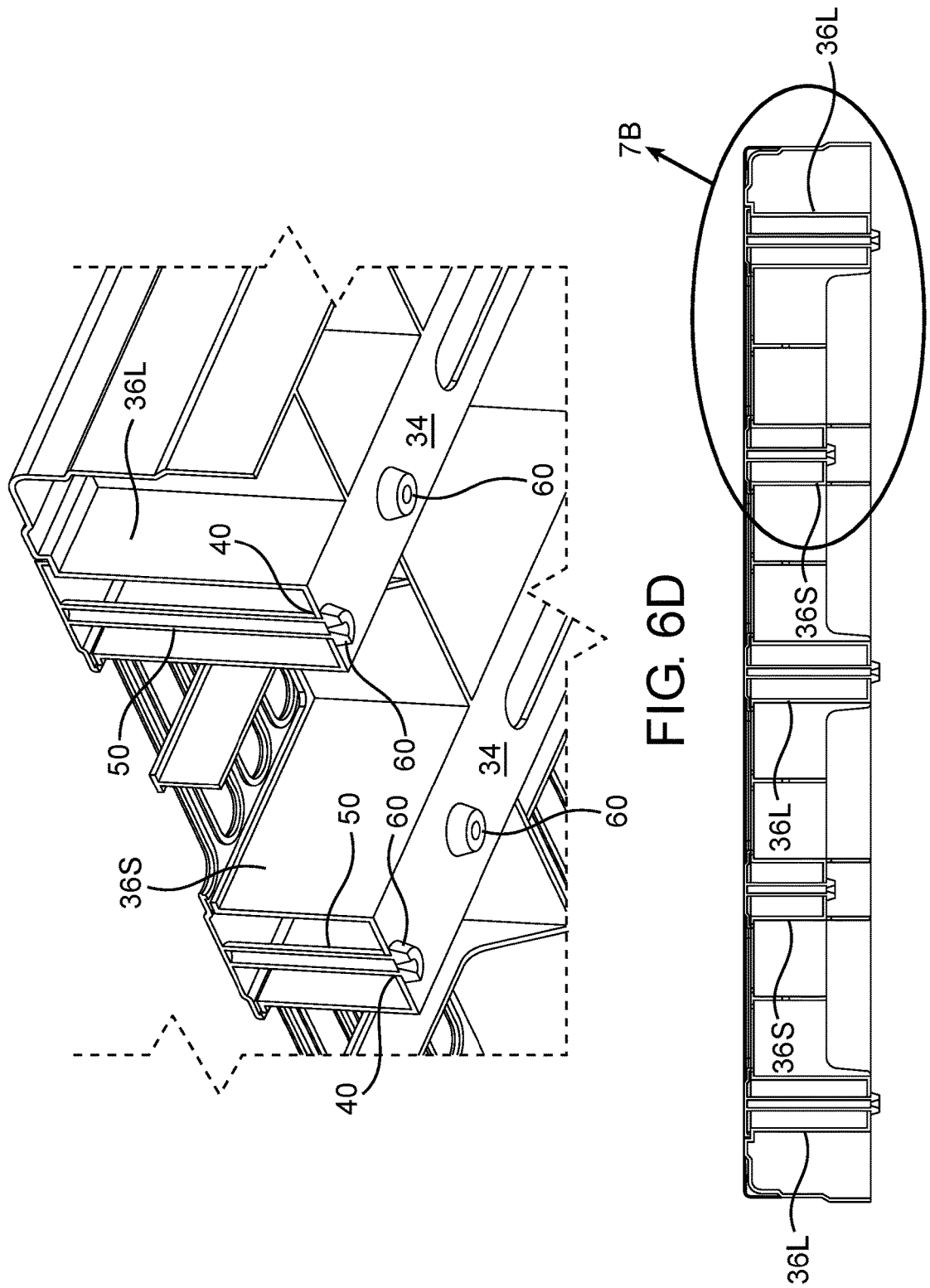

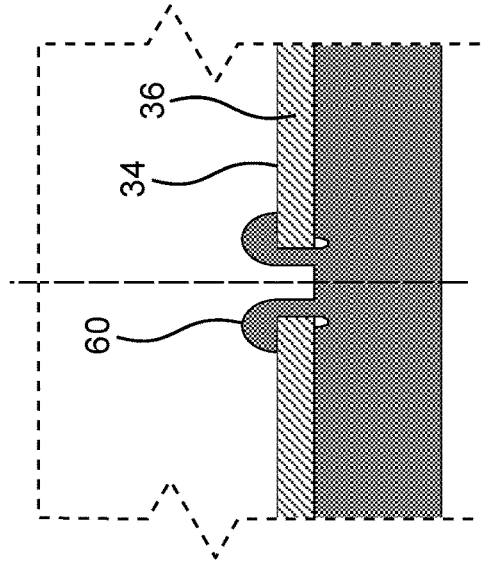
FIG. 8B
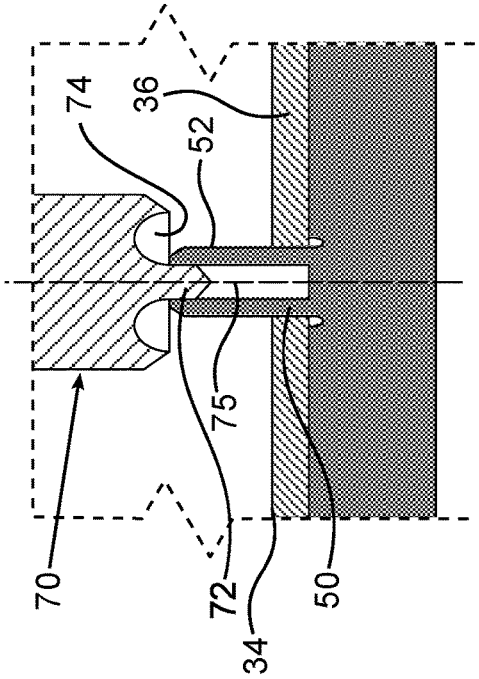
FIG. 8A
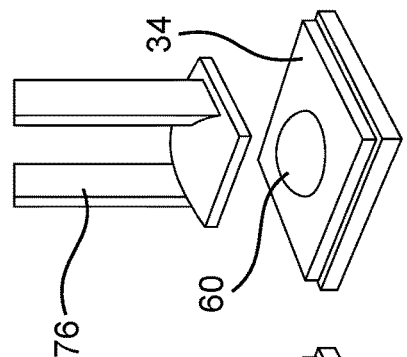
FIG. 9E
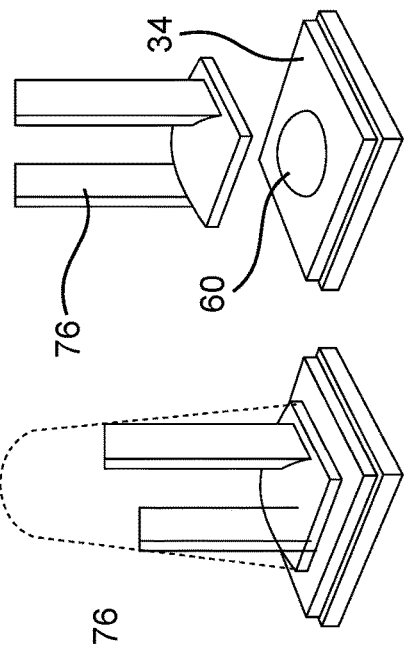
FIG. 9D
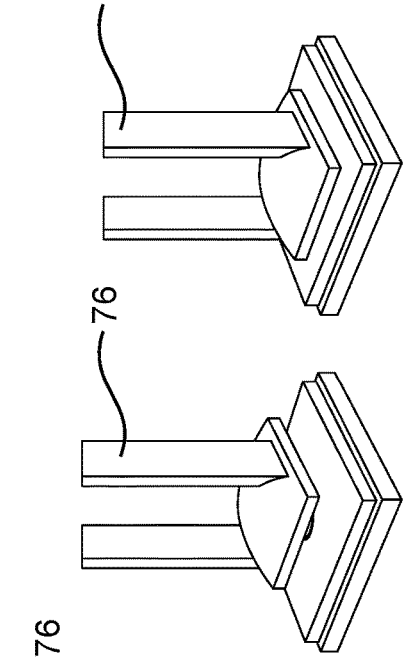
FIG. 9C
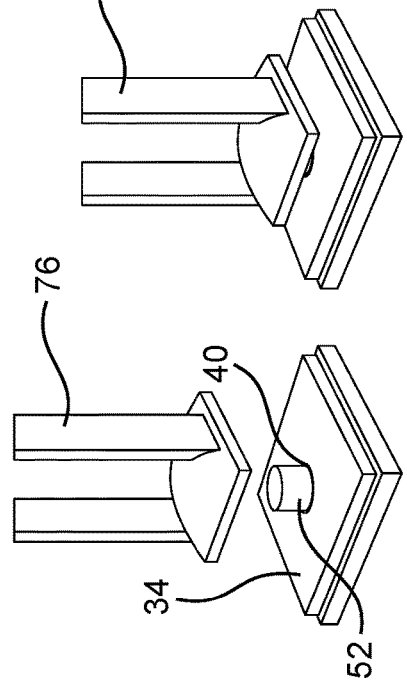
FIG. 9B
FIG. 9A

REINFORCED STRUCTURE AND METHOD FOR REINFORCING SAME

TECHNOLOGICAL FIELD

The present disclosure is generally in the field of reinforced structures and a method for reinforcing same. More particularly the present disclosure is concerned with polymeric furniture structure elements and their reinforcement.

BACKGROUND ART

The following references may be considered to be of relevance as background to the presently disclosed subject matter:
JP3051780U
WO2016056912A1
U.S. Pat. No. 6,725,785

BACKGROUND

JP3051780U discloses a base molded from a hard resin such as ABS or polycarbonate, and a frame is formed on a back side of the base and is surrounded by a falling wall and a vertical rib. A reinforcing frame molded from a hard resin such as BS or polycarbonate is fitted inside, and the reinforcing frame is integrally fixed to the base by ultrasonic welding, high frequency welding, or an adhesive, and substantially the entire length of the base, A pair of reinforcing frames are integrated with both side edges of the base. Thus, the strength of the base against bending is improved, and the deformation of the base is prevented.

WO2016056912A1 discloses a shelf for a rolling container, a rolling container provided therewith and a method for transporting and/or storing goods. The shelf according to the invention comprises: —a loading surface suitable for placing goods thereon; —a support plate arranged in use on the underside of the loading surface for the purpose of supporting the loading surface; and—a number of connecting hooks arranged at or close to corner points of the loading surface and configured for attachment to the rolling container, wherein the loading surface and the support plate are connected to each other by means of one or more shaped edges.

U.S. Pat. No. 6,725,785 discloses a protective cover of a grille-shaped article support includes a flat portion for holding articles on, and a surrounding wall joined to edges of the flat portion. Clipping elements are provided on bottom side of the flat portion, and hooking elements are provided on inner side of the wall. The cover is firmly fitted over the article support with the clipping elements clipping onto corresponding metal bars of the article support, and with the hooking elements hooking onto edges of the article support so that articles can be stably held on the article support.

It is appreciated that acknowledgement of the above references is not to be inferred as meaning that these are in any way relevant to the patentability of the presently disclosed subject matter.

GENERAL DESCRIPTION

In one of its aspects, the present disclosure provides a reinforced furniture element comprising a furniture element and at least one reinforcing element. The furniture element is configured with a first face and a spaced apart second face, one or more reinforcing members extending between the first face and the second face, a plurality of throughgoing stud receiving bores extending through the one or more reinforcing members between the first face and the second face; said first face is configured with a reinforcing element bearing surface, and the second face is configured with a stud bearing surface. The reinforcing element is configured with a first face bearing surface, and a plurality of studs extending from first face bearing surface, said studs are disposed in register with locations of at least some of the stud receiving bores, and a free end of the studs is configurable with a bearing head for tight bearing over the stud bearing surface.

The term 'furniture' as used herein is used in its broad sense and denotes any form of furniture unit and structural element thereof, such as shelving units, tabletops, partition walls, etc.

The arrangement is such that once the reinforcing element is applied and articulated over the furniture element, the reinforcing element becomes secured and solidly fastened thereto, so as to increase the module of elasticity of the reinforced furniture element, thus increasing its bending resistance.

An effective length of the studs is defined along a stud, extending between a level of contact between the first face and the first face bearing surface, and the stud bearing surface. An actual length of the reinforcing members is defined along throughgoing stud receiving bores, between the first face and the stud bearing surface.

According to a particular example of the disclosure, the effective length is slightly shorter than an actual length, wherein at an assembled position the studs are stressed, so as to apply attracting force to acting in a sense attracting the reinforcing element to bare over the first surface of the furniture element.

According to another aspect of the disclosure there is provided a method for assembling a reinforced furniture element, the method comprising the following steps:
  a. obtaining a furniture element configured with a first face and a spaced apart second face, one or more reinforcing members extending between the first face and the second face, a plurality of throughgoing stud receiving bores extending through the one or more reinforcing members between the first face and the second face; said first face is configured with a reinforcing element bearing surface, and the second face is configured with a stud bearing surface;
  b. obtaining a reinforcing element configured with a first face bearing surface, and a plurality of studs extending from first face bearing surface, said studs are disposed in register with locations of at least some of the stud receiving bores, and wherein a free end of the studs is configurable with a bearing head;
  c. introducing the free ends of the studs into stud receiving bores until the first face bearing surface of the reinforcing element bears tight over the first face of the furniture element, wherein the free ends project from the stud bearing surface of the second face of the furniture element; and
  d. configuring the bearing head of the studs to tightly bear over the stud bearing surface.

Any one or more of the following features, designs and configurations can be applied to the reinforced furniture element and furniture element, according to any aspect of the present disclosure, separately or in various combinations thereof;

the bearing head can be configured with a diameter greater than the diameter of the throughgoing stud receiving bores;

the bearing head can be deformed into a mushroom-like shape;

the bearing head can be a compressible mushroom-like snap type head;

the first face and the second face of the furniture element can be disposed parallel to one another;

the plurality of studs can extend normal to the first face bearing surface;

the plurality of studs can extend parallel to one another;

the reinforcing members can be disposed parallel to one another;

the reinforced furniture element can be a shelf;

the first face can be a top face or a bottom face, and the second face can be a bottom face or a top face, respectively;

the reinforcing element can be applied to either a top face or a bottom face of the furniture element;

the stud bearing surface can be disposed parallel to the first face;

the stud bearing surface can be elastic;

the first face can be configured with depressions for at least partially receiving at least portions of the reinforcing element;

the first face and the second face can be flat or configured with depressions for receiving at least portions of the reinforcing element;

the reinforced furniture element can be configured with one or more reinforcing elements, each of which being independently articulated to the furniture element;

the furniture element and the reinforcing element can be made of the same material, or not;

the furniture element and the reinforcing element can be made of polymeric materials;

the furniture element and the reinforcing element can assume different colors and different patterns;

the bearing head of the studs can be configured into bearing over the stud bearing surface by melting the end portion of the studs, to thereby deformed into a mushroom-like shape having a widened cross section;

melting the end portion of the studs can be configured with a heat applying device, or by ultrasonic stacking;

a top surface of the reinforcing element can be flush with a top surface of the furniture element;

the reinforced furniture element being a shelf;

the reinforcing element can occupy a major surface of the furniture element;

the reinforced furniture element can be configured with two or more reinforcing elements, said with two or more reinforcing elements can be configured at either face of the furniture element, as well as at side faces thereof;

the throughgoing stud receiving bores and the respective studs can be of equal length or of different lengths;

the furniture element and the reinforcing element can be made of thermoplastic material and wherein deforming the studs by ultrasonic welding results in molecular bonding of the studs with the stud bearing surface;

the furniture element and the reinforcing element can be rigid structures;

the arrangement is such that at an assembled position configuring the bearing heads for tight bearing over the stud bearing surface takes place simultaneously with applying pressure to tightly adjoin the furniture element and a reinforcing element, so that the studs are stressed.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIG. 6D is an enlarged view of the portion marked 6D in FIG. 6C;

FIG. 7A is a planar side view of the section of FIG. 6C;

FIGS. 8A-8B are schematic representations illustrating deforming of the studs by ultrasonic welding; and FIGS. 9A-9E are schematic representations of the articulation steps.

DETAILED DESCRIPTION OF EMBODIMENTS

Figures 1, 2A:
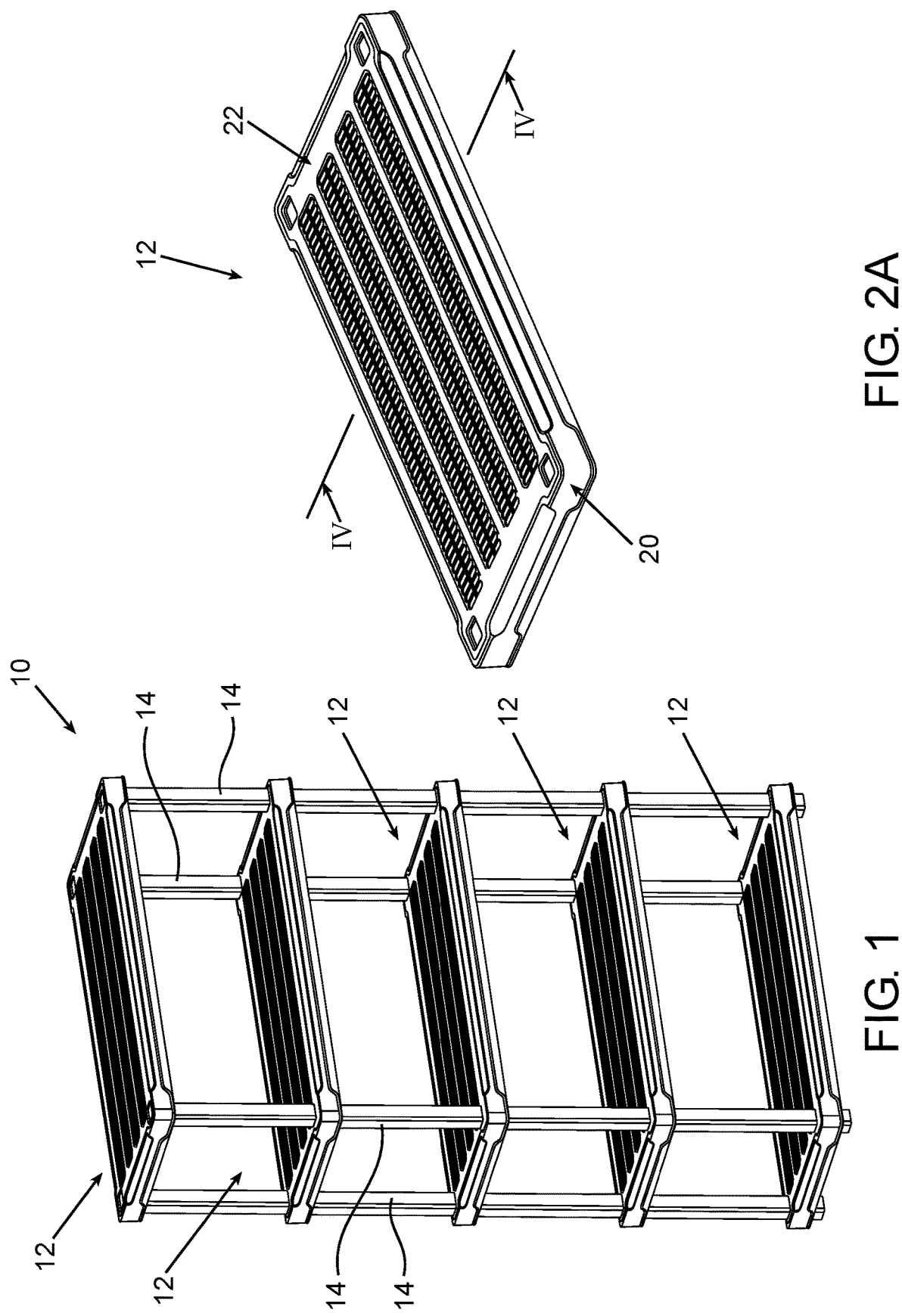
FIG. 1 is a perspective view of a shelving system, comprising several reinforced furniture elements, according to an example of the present disclosure.
FIG. 2A is a top perspective view of a reinforced furniture element, namely a shelf of the shelving system seen in FIG. 1.
Figure 2B:
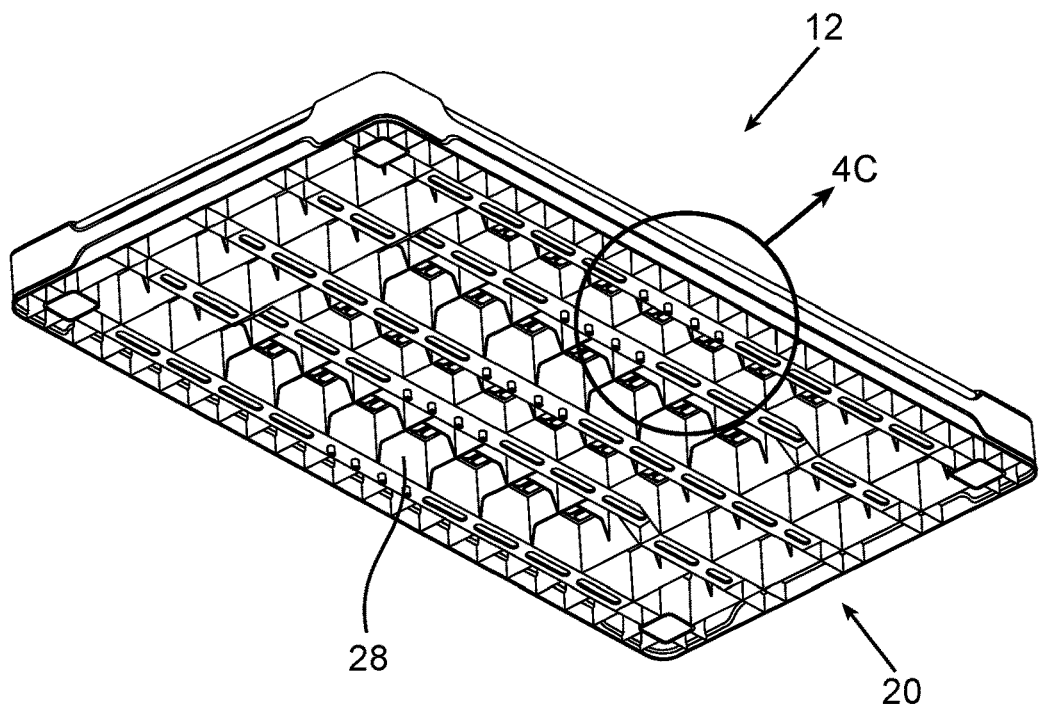
FIG. 2B is a bottom perspective view of the shelf seen in FIG. 2A, prior to fastening the studs of the reinforcing elements.

Attention is first directed to FIGS. 1 and 2A, illustrating a shelving system generally designated 10, comprising, in this specific non-limiting example, five spaced apart shelves, each designated 12, supported over corner support posts 14. For sake of clarity, the shelving system is a mere example, and each shelve is considered herein as a reinforced furniture element. However, a reinforced furniture element according to the disclosure can be any sort of article and can be of any shape and design.

Figure 3A:
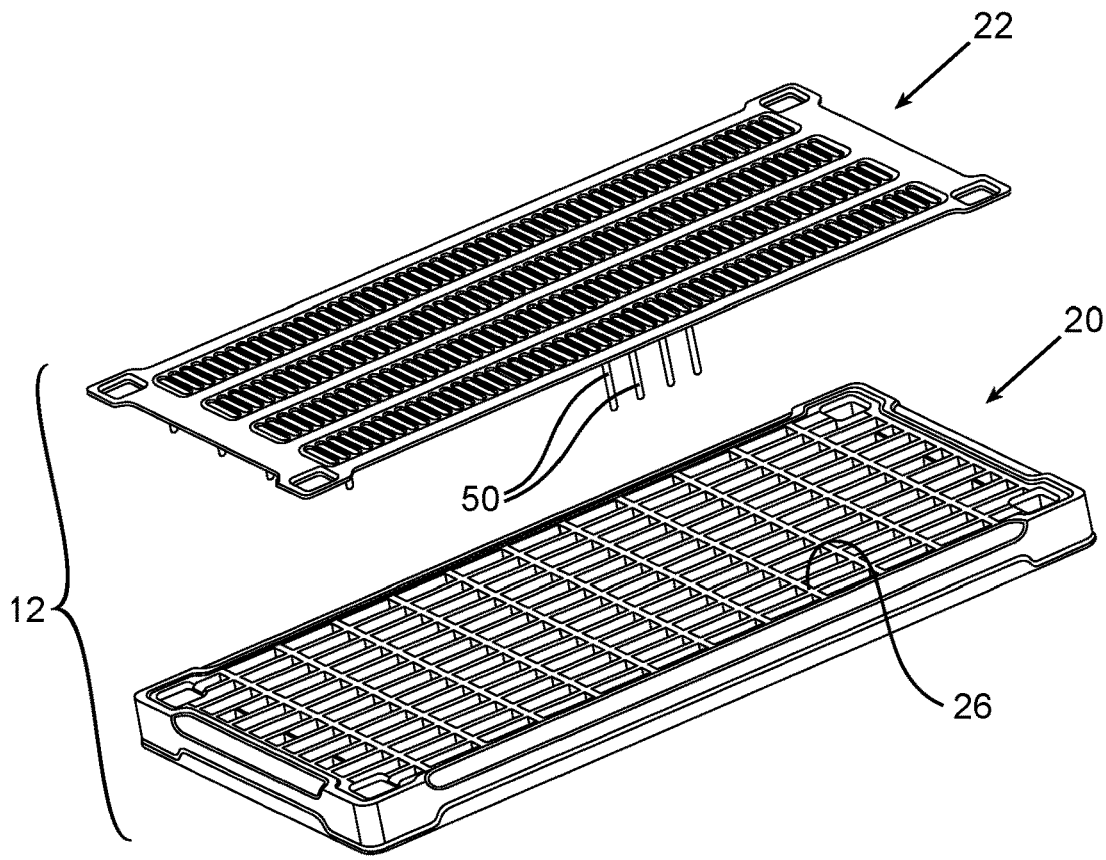
FIG. 3A is an exploded view of FIG. 2A (prior to fastening the studs of the reinforcing elements)
Figure 3B:
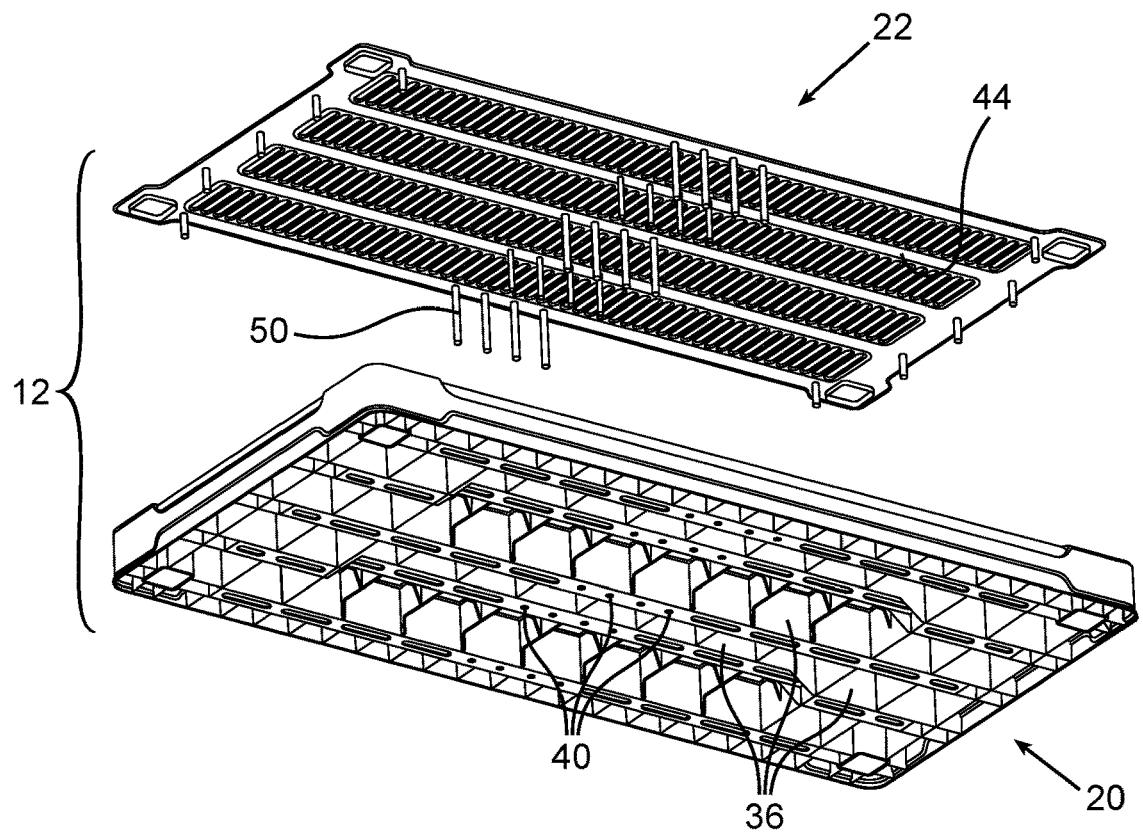
FIG. 3B is an exploded view of FIG. 2B.
Figure 4A:
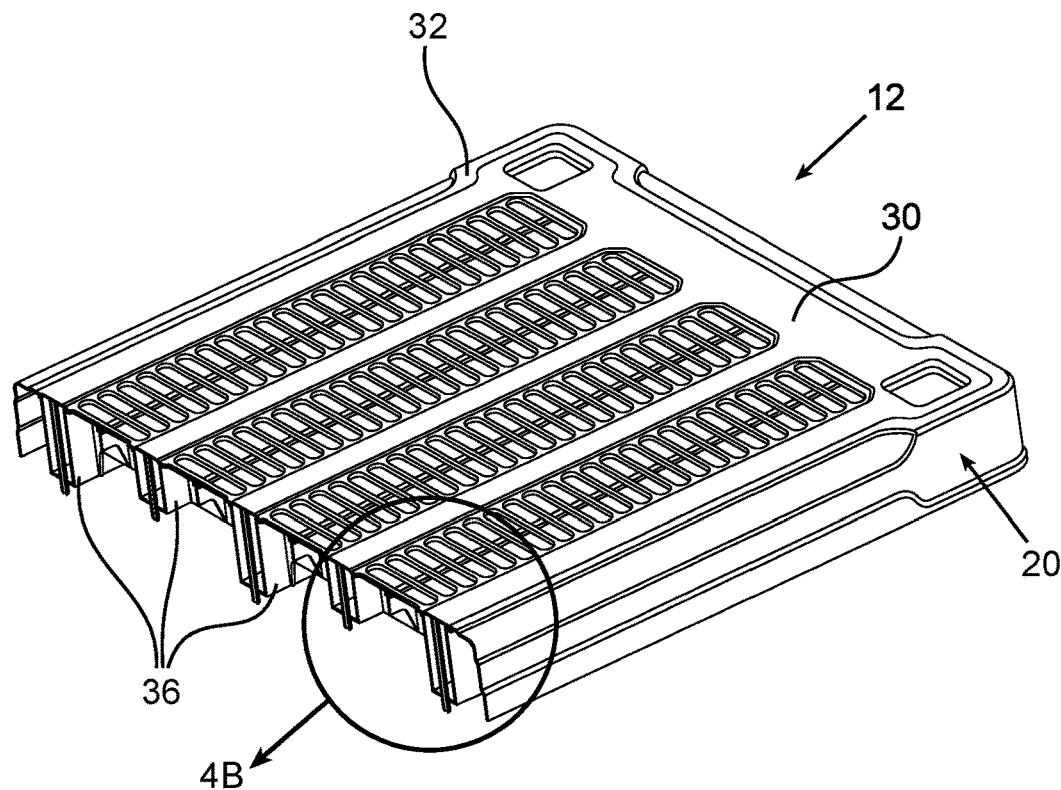
FIG. 4A is a section along line IV-IV in FIG. 2A (prior to fastening the studs of the reinforcing elements)
Figure 4B:
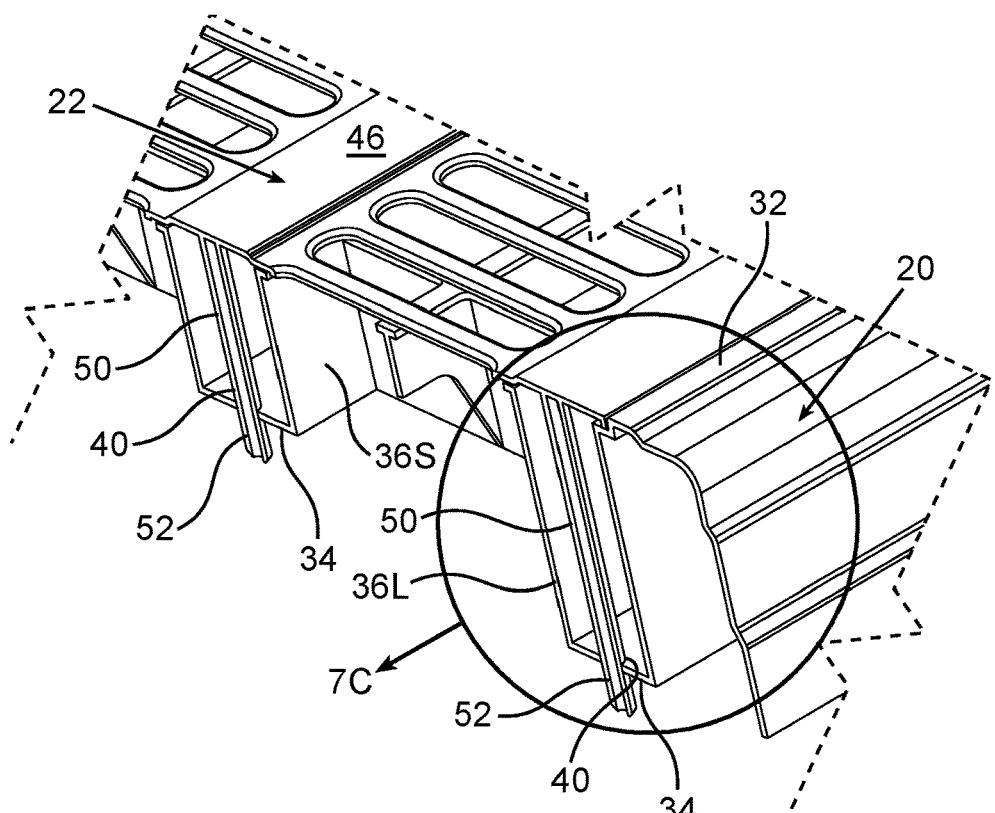
FIG. 4B is an enlarged view of the portion marked 4B in FIG. 4A.
Figure 4C:
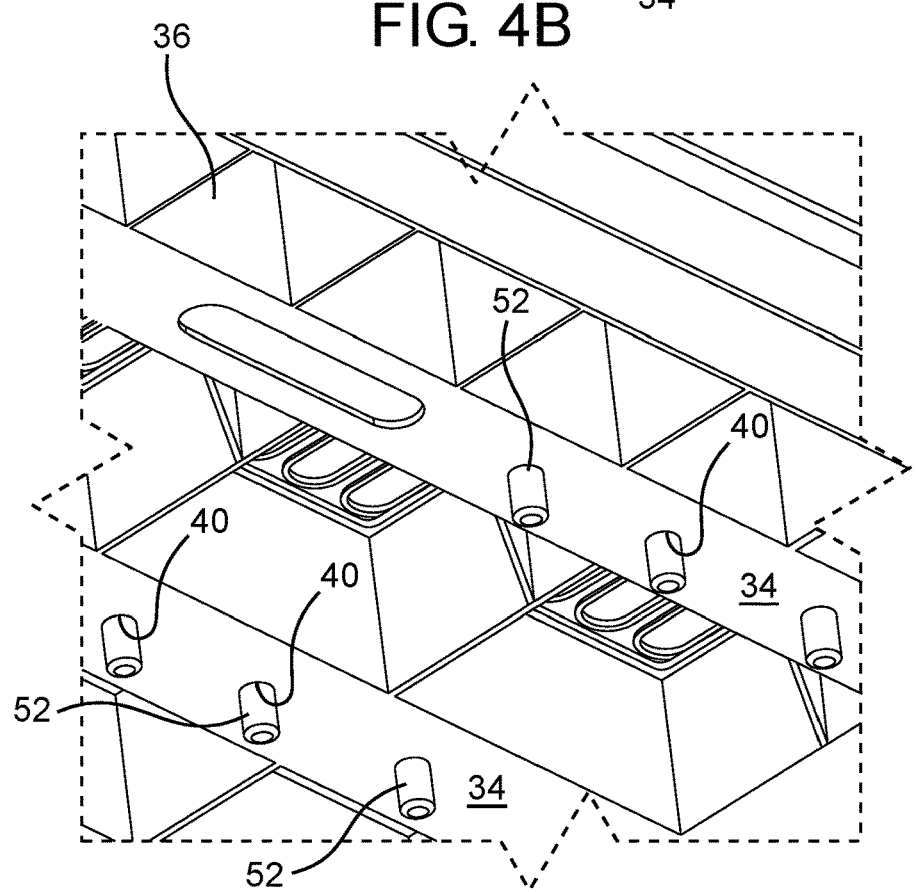
FIG. 4C is an enlarged view of the portion marked 4C in FIG. 2B.
Figure 4D:
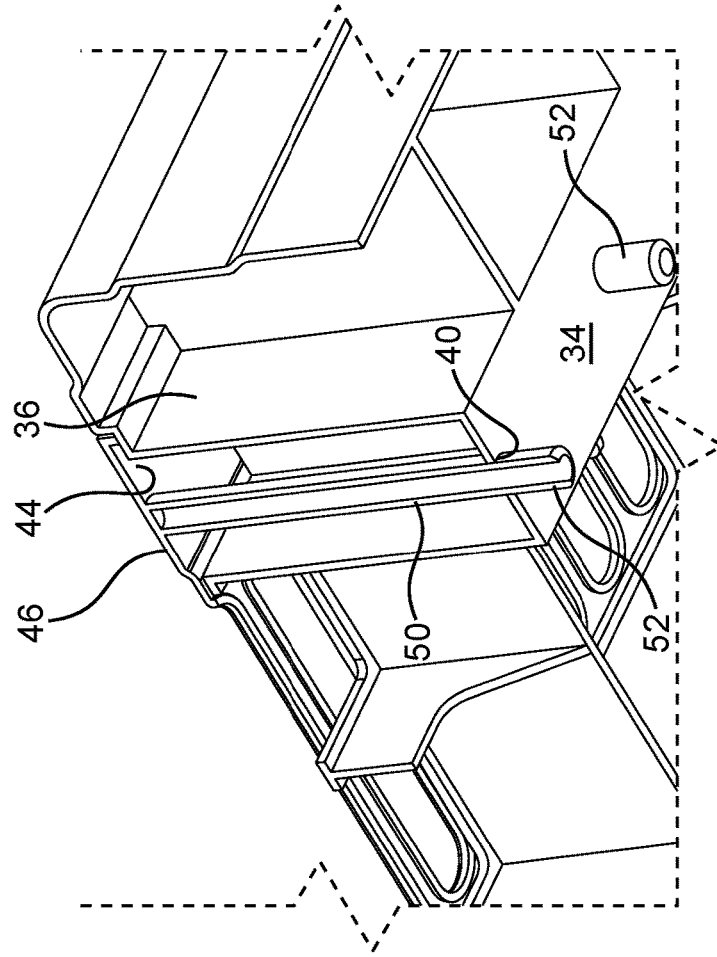
FIG. 4D is a bottom perspective view of the sectioned portion of FIG. 4B.
Figure 5A:
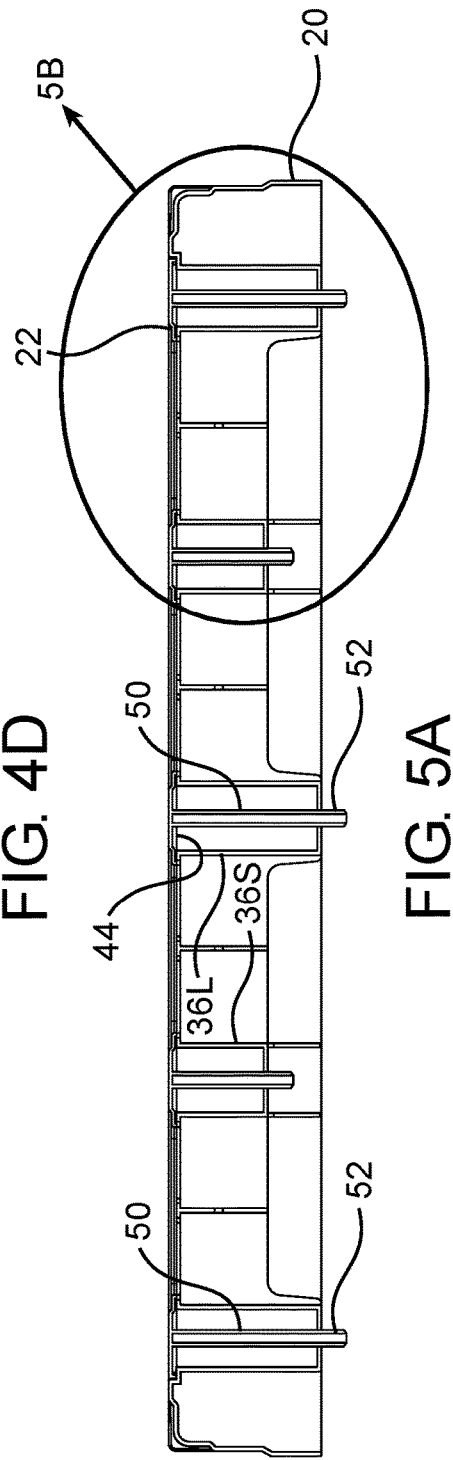
FIG. 5A is a planar side view of the section of FIG. 4A.
Figure 5B:
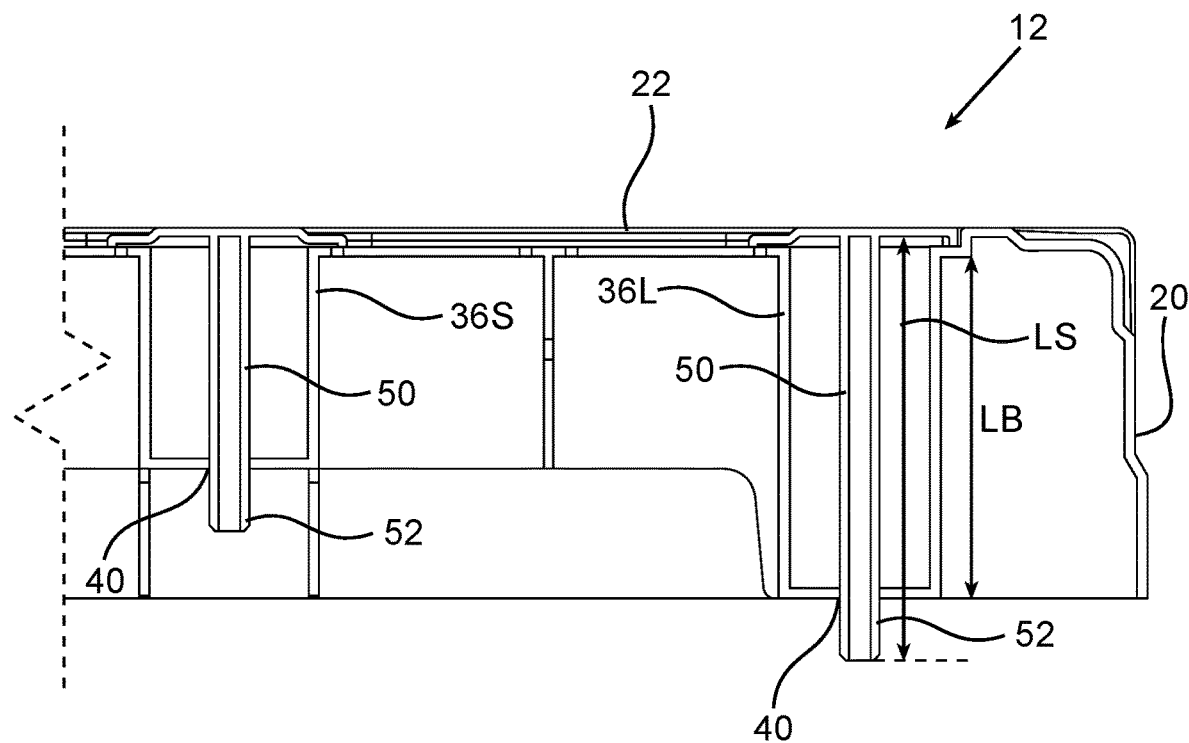
FIG. 5B is an enlarged view of the portion marked 5B in FIG. 5A.
Figure 6A:
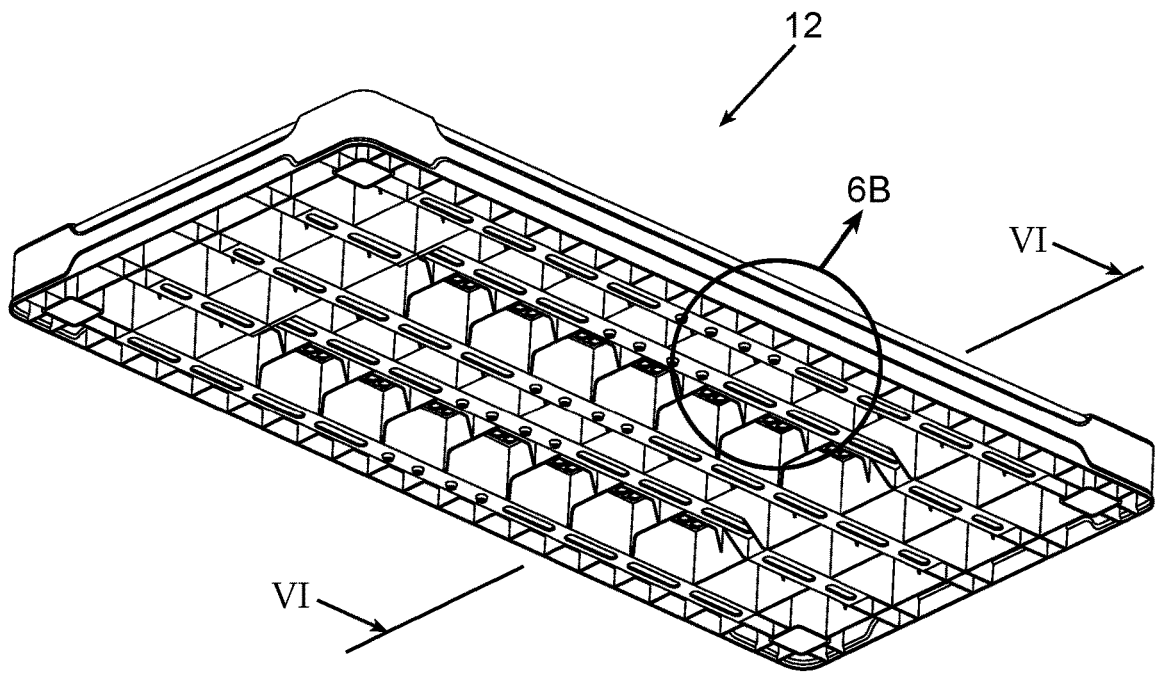
FIG. 6A is a bottom perspective view of the shelf seen in FIG. 2A, after to fastening the studs of the reinforcing elements.
Figure 6B:
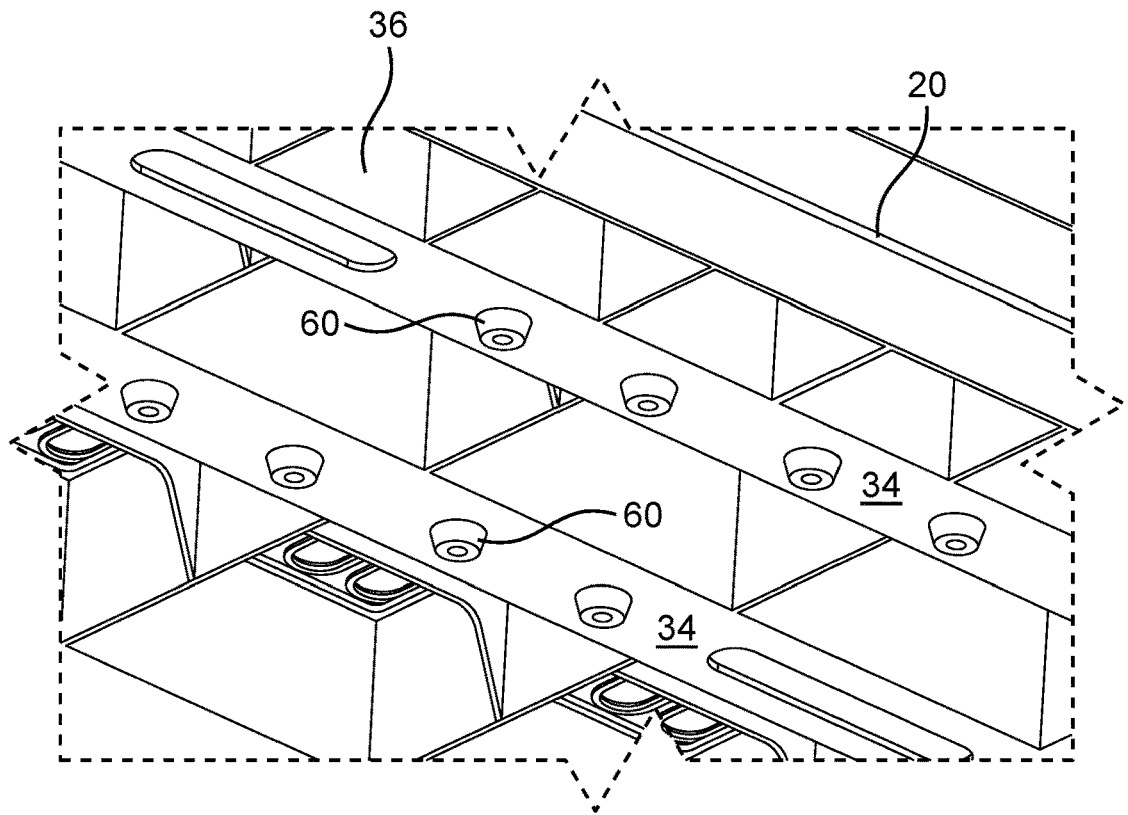
FIG. 6B is an enlarged view of the portion marked 6B in FIG. 6A.
Figure 6C:
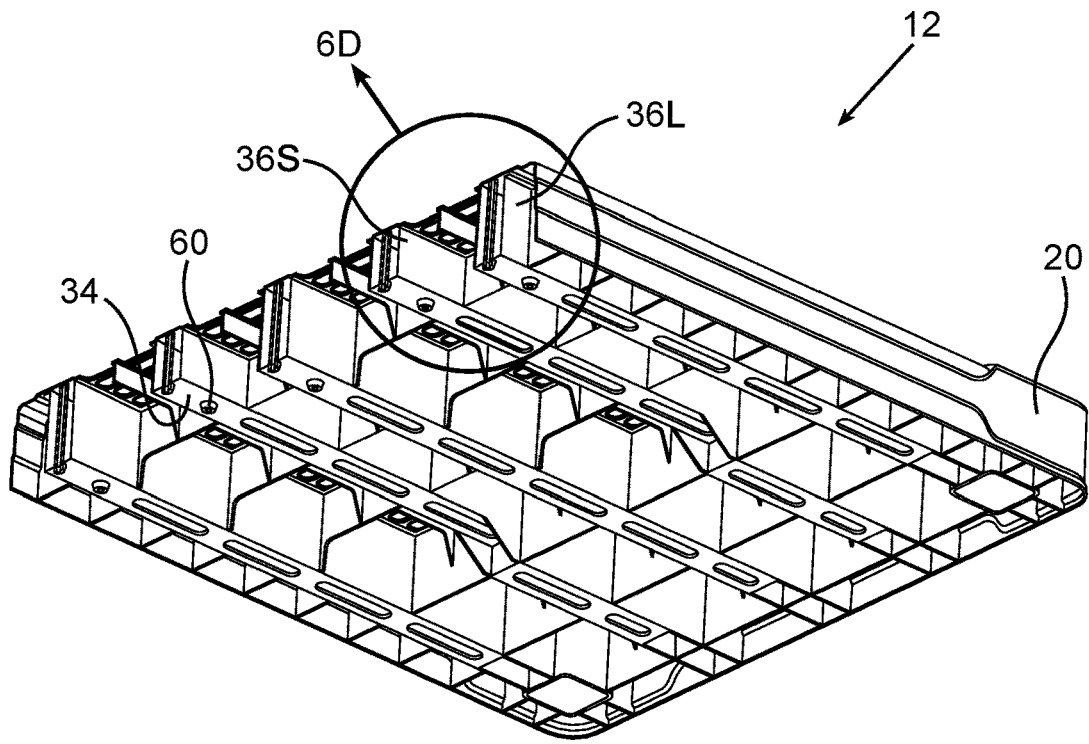
FIG. 6C is a section along line VI-VI in FIG. 6A.

With further reference to FIGS. 2B to 5B, and as best seen in FIGS. 3A and 3B, the reinforced furniture element, namely each shelf 12, comprises a furniture element 20 and a reinforcing element 22, wherein the furniture element 20 is a base shelf structure configured for supporting by the support posts 14, and the reinforcing element 22 is in the form of a substantially flat member, sized for bearing over the furniture element 20, as will be explained hereinafter.

Referring in detail first to the furniture element 20, it is a rigid polymeric rectangle element configured with a first (top) face 26 and a spaced-apart second (bottom) face 28. The first face 26 is configured with a reinforcing element bearing surface 30 being a major depressed portion of the furniture element 20, defined by a peripheral rim 32, and the second face 28 is configured with a stud bearing surface 34. A plurality of reinforcing members 36, namely elongate ribs extend between the first face 26 and the second face 28, with portions of the reinforcing members 36 configured with a plurality of throughgoing stud receiving bores 40, extending between the first face 26 and the second face 28.

Turning now to the reinforcing element 22, it is a substantially flat, rigid polymeric element configured with a first face bearing surface 44 (i.e. the bottom face thereof) and a top surface 46, with a plurality of rigid studs 50 extending downwards from first face bearing surface 44. The arrangement is such that when the reinforcing element 22 is placed over the furniture element 20 the studs 50 are disposed in register with locations of the stud receiving bores 40, and wherein the initial length $L_S$ of the studs 50 is greater than the length $L_B$ of the stud receiving bores 40 ($L_S > L_B$) such that at an assembled position, prior to deformation as will be discussed below, a free end 52 of the studs 50 projects below the stud bearing surface 34 of the reinforcing members 36. It is further seen that the studs 50 are tubular cylindrical elongate members, though other configurations can be possible too (not shown).

It is appreciated that in the particular example the reinforcing members of the furniture element are not of equal height and comprise short reinforcing members 36S and longer reinforcing members 36L, this being an example only.

Once the reinforcing element 22 is placed over the furniture element 20, bearing surface 44 of the reinforcing element 22 bears over the first (top) face 26 of the furniture element 20, and with the studs 50 received within the respective stud receiving bores 40. At this position the reinforcing element 22 is received within the depressed portion and the top surface 46 is flush with the peripheral rim 32.

With further reference being made to FIGS. 6A-7C, reinforcing the furniture element 20 takes place by deforming the free ends 52 of the studs 50 configured into a mushroom-like bearing head 60, tightly bearing over the stud bearing surface 34 of the reinforcing members 36.

Figure 7B:
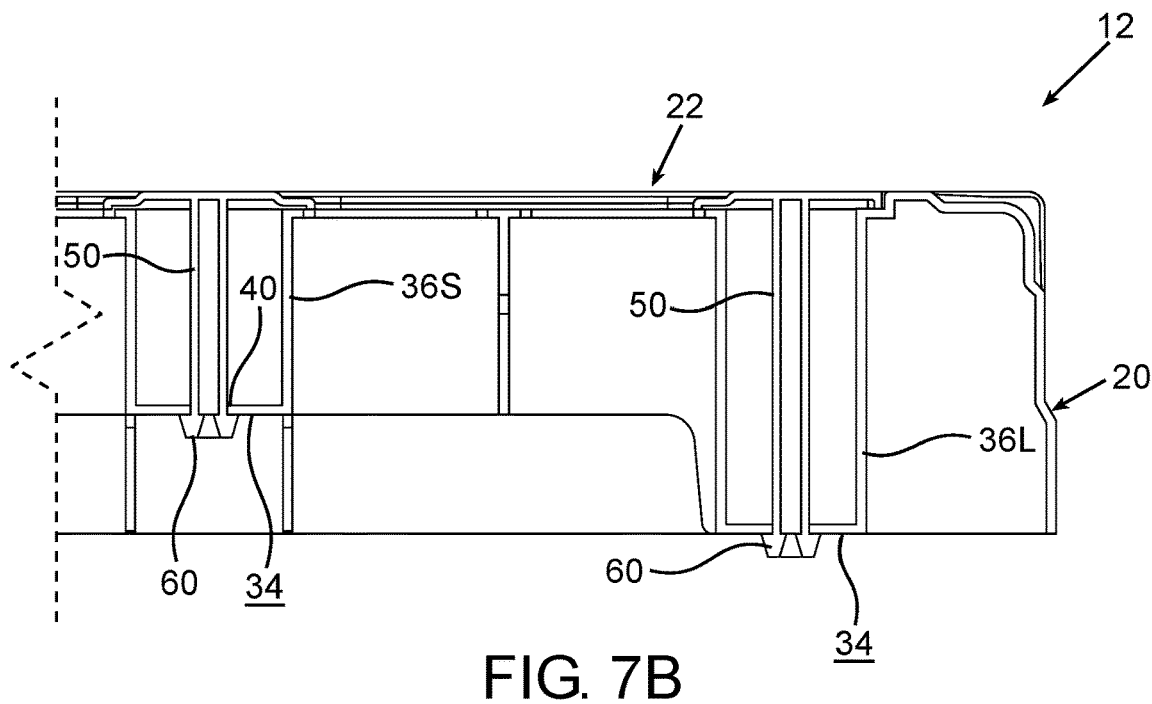
FIG. 7B is an enlarged view of the portion marked 7B in FIG. 7A.
Figure 7C:
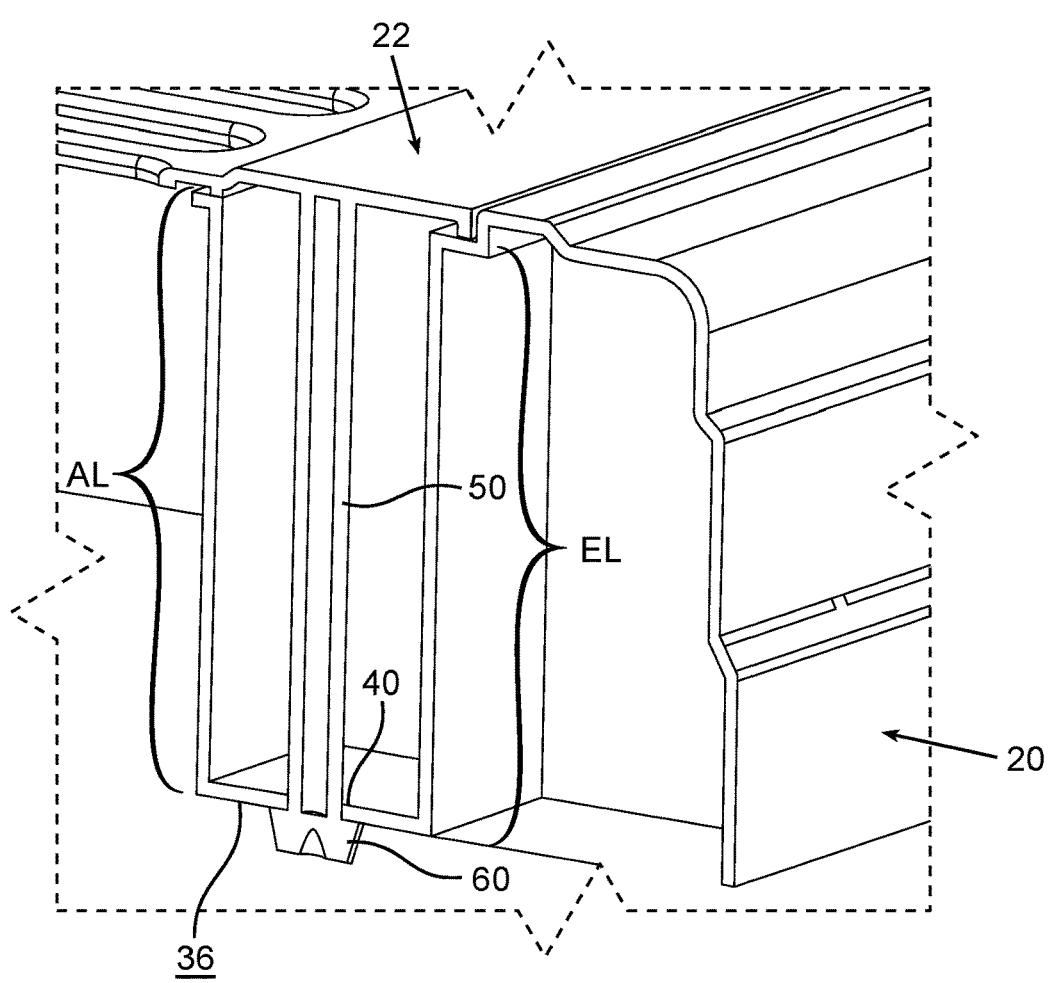
FIG. 7C is an even enlarged view of the portion marked 7C in FIG. 4B.

The arrangement is such that configuring the bearing heads 60 for tight bearing over the stud bearing surface 34 takes place simultaneously with applying pressure to tightly adjoin the furniture element 20 and a reinforcing element 22, so that the studs 50 are stressed. Thus, as illustrated in FIG. 7C, at the assembled position of the reinforced furniture element (shelf 12), an effective length $E_L$ of the studs is very slightly shorter than an actual length $A_L$ of the reinforcing members, $E_L < A_L$. Effective length $E_L$ is defined along a stud; extending between a level of contact between the first face and first face bearing surface, and the stud bearing surface); and actual length $A_L$ is defined is defined along throughgoing stud receiving bores, between the first face and the stud bearing surface.

Turning now to FIGS. 8A and 8B there are represented examples of manufacturing steps of a reinforced furniture element according to the disclosure. Referring first to FIG. 8A, a sonotrode 70 is applied to the free end 52 of a stem 50, said sonotrode 70 configured with a penetrating head 72 configured for introducing into a lumen 75 of a stem end 52, and having a shaped head 74 configured for stacking, i.e. applying heat to the free end 52 thus melting it for reshaping it in conformance with the shape of the head 74, so that upon cooling the bearing end assumes a mushroom-like shape bearing head 60 bearing against the stud bearing surface 34, as in FIG. 8B.

FIGS. 9A-9E illustrate consecutive steps of heat stacking of the free ends 52 of the studs 50 into mushroom-like shape bearing heads 60. In the first step shown in FIG. 9A, the positioning of the free ends 52 through bores 40 is confirmed. Then, a heated anvil/iron 76 (same shape as sosotrode 70 as in FIG. 8A) is advanced to the free end 52 of studs 50 (FIG. 9B) and heat is applied thereto (FIG. 9C), deforming the free ends into mushroom-like shape bearing heads 60 bearing against the stud bearing surface 34, water which the bearing heads 60 are cooled by applying chill to the anvil 76 (FIG. 9D), to assumes a mushroom-like shape bearing head 60 bearing against the stud bearing surface 34, as shown in FIG. 9E.

Whilst in the illustrated examples the bearing head is mushroom-like shaped configured through a heat deforming process, it is appreciated that other arrangements are possible to for stressing the studs within the stud receiving bores at the assembled position. One such example is pre-forming the studs with a snap-type mushroom like free end configurable for introducing through the bore and configurable for spontaneous sap engagement upon penetrating through a bottom end of the reinforcing member 36 in a snap-type fashion.

The invention claimed is:

1. A reinforced furniture element comprising a furniture element and two or more reinforcing elements,
   said furniture element comprises a first face and a spaced apart second face, one or more reinforcing members extending between the first face and the second face, a plurality of throughgoing stud receiving bores extending through the one or more reinforcing members between the first face and the second face; said first face comprises a reinforcing element bearing surface, and the second face comprises a stud bearing surface;
   the reinforcing element comprises a first face bearing surface, and a plurality of studs extending from the first face bearing surface, said studs are disposed in register with locations of at least some of the stud receiving bores, and a free end of the studs comprises a bearing head for bearing over the stud bearing surface, and
   said two or more reinforcing elements being located at either the first face or the second face or the furniture element.

2. The reinforced furniture element of claim 1, wherein the studs are stressed attracting and hold the reinforcing element in a bearing position over the first surface of the furniture element.

3. The reinforced furniture element of claim 1, wherein each of the bearing heads of each of the studs has a diameter greater than a diameter of the throughgoing stud receiving bores.

4. The reinforced furniture element of claim 1, wherein the plurality of studs extend normal to the first face bearing surface and parallel to one another.

5. The reinforced furniture element of claim 1, wherein the reinforced furniture element is a shelf.

6. The reinforced furniture element of claim 1, wherein the reinforcing element is applied to a top face of the furniture element.

7. The reinforced furniture element of claim 1, wherein the stud bearing surface is disposed parallel to the first face.

8. The reinforced furniture element of claim 1, wherein the stud bearing surface is elastic.

9. The reinforced furniture element of claim 1, wherein the first face comprises depressions for at least partially receiving at least portions of the reinforcing element.

10. The reinforced furniture element of claim 1, wherein the first face and the second face each comprises depressions for receiving at least portions of the reinforcing element.

11. The reinforced furniture element of claim 1, wherein the furniture element and the reinforcing element are made of polymeric material.

12. The reinforced furniture element of claim 1, wherein each of the bearing heads of each of the studs bears over the stud bearing surface by melting the end portion of the studs, to thereby deform into a dome shape having a widened cross section.

13. The reinforced furniture element of claim 1, wherein a top surface of the reinforcing element is flush with a top surface of the furniture element.

14. The reinforced furniture element of claim 1, wherein the throughgoing stud receiving bores and the respective studs are of equal length or of different lengths.

15. The reinforced furniture element of claim 1, wherein the furniture element and the reinforcing element are rigid structures.

16. The reinforced furniture element of claim 1, wherein the reinforcing element is applied to a bottom face of the furniture element.

* * * * *